Figure 1:
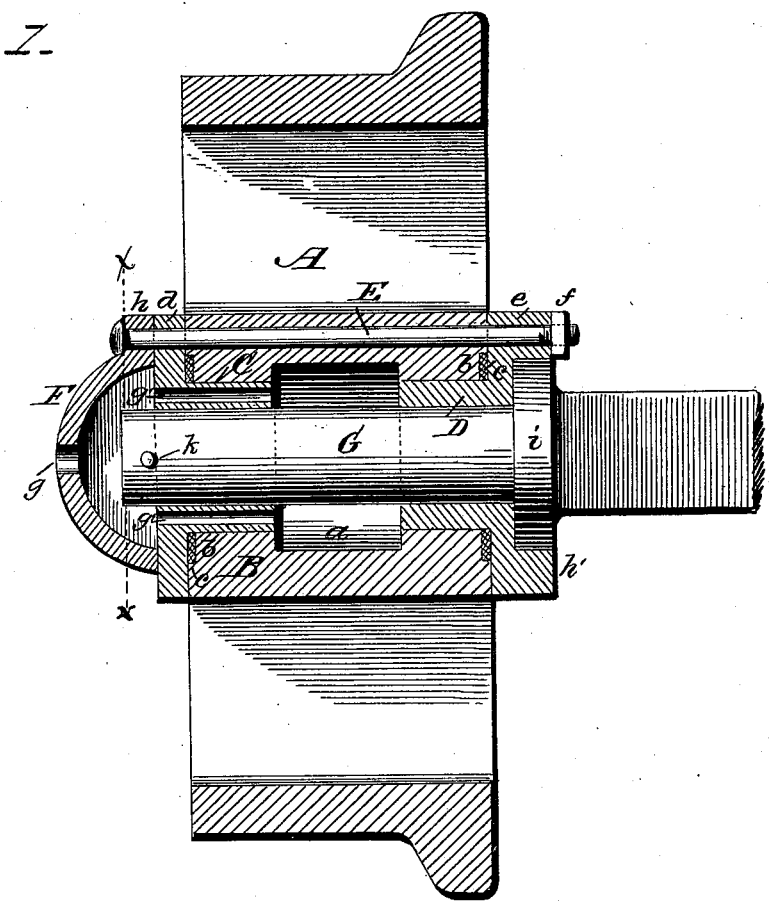

(No Model.)

E. EWERS.
LUBRICATING CAR WHEEL.

No. 568,528. Patented Sept. 29, 1896.

Witnesses
O. Williamson.
Wm. Brown.

Inventor
Eugene Ewers.
per Chas. H. Fowler.
Attorney.

UNITED STATES PATENT OFFICE.

EUGENE EWERS, OF ARDMORE, MISSOURI.

LUBRICATING CAR-WHEEL.

SPECIFICATION forming part of Letters Patent No. 568,528, dated September 29, 1896.

Application filed May 14, 1896. Serial No. 591,562. (No model.)

*To all whom it may concern:*

Be it known that I, EUGENE EWERS, a citizen of the United States, residing at Ardmore, in the county of Macon and State of Missouri, have invented certain new and useful Improvements in Lubricating Car-Wheels; and I do hereby declare that the following is a full, clear, and exact description of the same, reference being had to the annexed drawings, making a part of this specification, and to the letters of reference marked thereon.

The present invention has relation more particularly to that class of car-wheels used on mine-railways, although my improvement is equally applicable to car-wheels of every description; and it consists in providing the hub of the wheel with means by which the axle may be conveniently lubricated, such means being shown in the drawings and hereinafter described and claimed.

Figure 2:
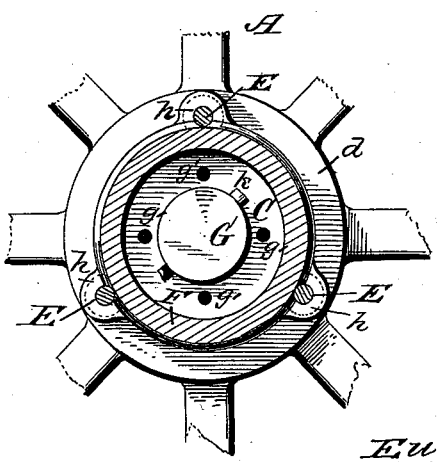

Figure 1 of the drawings is a longitudinal section of a car-wheel with its attachments, showing the end of the axle in elevation and connecting with the wheel; Fig. 2, an end sectional view taken on line $x$ $x$ of Fig. 1.

In the accompanying drawings, A represents the car-wheel, which may be of any of the usual forms, and B its hub, provided with a circumferential recess $a$ to form an oil or lubricating chamber. The hub at its outer sides is formed with a seat $b$, to retain thereon a packing-ring $c$ to form a tight joint between the outer sides of the hub and the flanges $d\ e$ of the bushings C D, respectively. These bushings C D fit within the hub and are of a length to extend only a short distance into the hub, or flush with the shoulders formed by the side walls of the recess $a$.

The bushings are held in position by means of clamping-rods E, which have heads at one end and are screw-threaded at the opposite end to receive nuts $f$. These clamping-rods also hold in place a concavo-convex cap F, which has a central opening $g$ for the introduction of the lubricant, said cap having ears $h$, through which the clamping-bolts pass, and the concavity of the cap forms a chamber for the lodgment of the lubricant.

The cap F extends over the end of the bushing C and is held thereto by the clamping-rods hereinbefore described, and said bushing has a plurality of oil-passages $g'$, which communicate at their respective ends with the chamber formed by the concavity of the cap F and the chamber formed by the recess $a$ in the hub.

The opposite bushing D is without these oil-passages, but has a mortised seat $h'$ for the flange $i$ of the axle G, a pin $k$ or other suitable means retaining the bearing end of the axle in engagement with the bushings C D.

The employment of the bushings takes the wear off the hub of the wheel, and when the bushings wear to that extent as to render them useless the bushings can be removed and others substituted. The bushings being short or not extending to form a bearing the entire length of the hub materially reduces the frictional wear upon both the axle and bushings, the central oil or lubricating chamber formed by the circumferential recess $a$ keeping the bearings well lubricated, and this, in addition to the chamber formed by the concave side of the cap F and the oil-passages $g'$, provides a complete and successful means of lubrication.

The bushings and cap may be conveniently removed by first removing the clamping-bolts, and any one of the parts may be replaced by a new one.

It should be noticed that the short bushings, in connection with the circumferential recess in the hub of the wheel, form together a chamber sufficiently large and deep to hold the lubricant.

Having now fully described my invention, what I claim as new, and desire to secure by Letters Patent, is—

In a car-wheel, the axle G, provided with a flange $i$, and having an opening through its outer end; the pin $k$, which passes through the axle and catches against the outer end of the bushing; the two short bushings C, D, each provided with a flange at its outer end to catch over the ends of the hub; and the packing-rings $c$, placed in recesses of the hub, combined with the clamping-bolts, and the concavo-convex cap F provided with a central opening; the bushing C being provided with openings $g$, which communicate with the central oil-chamber $a$ between the ends of the bushing, substantially as shown.

In testimony that I claim the above I have hereunto subscribed my name in the presence of two witnesses.

EUGENE EWERS.

Witnesses:
HUGH G. NOBLE,
DAVID S. JONES.